(12) United States Patent
Mercer et al.

(10) Patent No.: US 9,813,997 B2
(45) Date of Patent: Nov. 7, 2017

(54) ANTENNA COUPLING FOR SENSING AND DYNAMIC TRANSMISSION

(71) Applicant: Microsoft Corporation, Redmond, WA (US)

(72) Inventors: Sean Russell Mercer, Issaquah, WA (US); Charbel Khawand, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/152,529

(22) Filed: Jan. 10, 2014

(65) Prior Publication Data
US 2015/0201385 A1 Jul. 16, 2015

(51) Int. Cl.
| | |
|---|---|
| *H04W 72/00* | (2009.01) |
| *H04W 52/24* | (2009.01) |
| *H04B 1/3827* | (2015.01) |
| *H04B 17/00* | (2015.01) |
| *H04W 72/04* | (2009.01) |
| *H04W 52/36* | (2009.01) |

(52) U.S. Cl.
CPC ........ *H04W 52/245* (2013.01); *H04B 1/3838* (2013.01); *H04B 17/0057* (2013.01); *H04W 52/367* (2013.01); *H04W 72/0473* (2013.01)

(58) Field of Classification Search
CPC ............. H04B 1/3838; H04B 17/0057; H04W 52/367; H04W 52/245; H04W 72/0473
USPC ...................................................... 455/452.1
See application file for complete search history.

(56) References Cited

U.S. PATENT DOCUMENTS

| | | | |
|---|---|---|---|
| 4,016,490 A | 4/1977 | Weckenmann et al. |
| 4,729,129 A | 3/1988 | Koerner |
| 4,806,944 A | 2/1989 | Jacomb-Hood |
| 5,166,679 A | 11/1992 | Vranish et al. |
| 5,212,621 A | 5/1993 | Panter |
| 5,408,690 A | 4/1995 | Ishikawa et al. |
| 5,564,086 A | 10/1996 | Cygan et al. |
| 6,178,310 B1 | 1/2001 | Jeong, II |
| 6,657,595 B1 | 12/2003 | Phillips et al. |

(Continued)

FOREIGN PATENT DOCUMENTS

| | | |
|---|---|---|
| CN | 1123476 A | 5/1996 |
| CN | 1179864 A | 4/1998 |

(Continued)

OTHER PUBLICATIONS

"International Search Report and Written Opinion Issued in PCT Patent Application No. PCT/US2014/072412", Mailed Date: Mar. 30, 2015, 11 Pages.

(Continued)

*Primary Examiner* — Barry Taylor
(74) *Attorney, Agent, or Firm* — Holzer Patel Drennan (57) ABSTRACT

A wireless transmission system disclosed herein includes a transmitter-receiver pair. When a dielectric object approaches the transmitter-receiver pair, a signal strength of a transmitted carrier wave increases at the receiver. In response, transmission power of the transmitter can be dynamically reduced. When the dielectric object moves away from the transmitter-receiver pair, a signal strength of the carrier wave decreases at the receiver. In response, the transmission power of the transmitter can be dynamically increased.

20 Claims, 4 Drawing Sheets

(56) References Cited

U.S. PATENT DOCUMENTS

| | | |
|---|---|---|
| 6,989,745 B1 | 1/2006 | Milinusic et al. |
| 7,009,944 B1 | 3/2006 | Hulbert |
| 7,053,629 B2 | 5/2006 | Nevermann |
| 7,062,288 B2 | 6/2006 | Raaf et al. |
| 7,071,776 B2 | 7/2006 | Forrester et al. |
| 7,124,193 B1 | 10/2006 | Raaf et al. |
| 7,146,139 B2 | 12/2006 | Nevermann |
| 7,151,382 B1 | 12/2006 | Kean et al. |
| 7,162,264 B2 | 1/2007 | Vance |
| 7,167,093 B2 | 1/2007 | Fergusson |
| 7,541,874 B2 | 6/2009 | Maeda et al. |
| 7,729,715 B2 | 6/2010 | Love et al. |
| 7,917,175 B2 | 3/2011 | Song et al. |
| 8,063,375 B2 | 11/2011 | Cobbinah et al. |
| 8,134,461 B2 | 3/2012 | Van Doom |
| 8,208,423 B2 | 6/2012 | Liu et al. |
| 8,213,982 B2 | 7/2012 | Marlett et al. |
| 8,269,511 B2 | 9/2012 | Jordan |
| 8,324,549 B2 | 12/2012 | Romero et al. |
| 8,326,385 B2 | 12/2012 | Brogle et al. |
| 8,401,851 B2 | 3/2013 | Bushey |
| 8,417,296 B2 | 4/2013 | Caballero et al. |
| 8,432,322 B2 | 4/2013 | Amm et al. |
| 8,442,572 B2 | 5/2013 | Borran et al. |
| 8,466,839 B2 | 6/2013 | Schlub et al. |
| 8,483,632 B2 | 7/2013 | Arsani et al. |
| 8,515,496 B2 | 8/2013 | Cheng et al. |
| 8,547,952 B2 | 10/2013 | Liu et al. |
| 8,548,388 B2 | 10/2013 | Chiu et al. |
| 8,559,999 B2 | 10/2013 | Hu et al. |
| 8,565,205 B2 | 10/2013 | Ho et al. |
| 8,577,289 B2 | 11/2013 | Schlub et al. |
| 8,723,531 B2 | 5/2014 | Harrison |
| 8,723,749 B2 | 5/2014 | Lin et al. |
| 8,775,103 B1 | 7/2014 | Jayaraj et al. |
| 8,781,437 B2 | 7/2014 | Ngai et al. |
| 8,792,930 B1 | 7/2014 | Gopalakrishnan et al. |
| 8,798,695 B1 | 8/2014 | Zheng et al. |
| 8,860,526 B2 | 10/2014 | Manssen et al. |
| 8,922,443 B2 | 12/2014 | Zhu et al. |
| 8,975,903 B2 | 3/2015 | Salter et al. |
| 9,325,355 B2 | 4/2016 | Pecen et al. |
| 9,337,833 B2 | 5/2016 | Siska |
| 9,466,872 B2 | 10/2016 | Sanchez et al. |
| 2002/0009976 A1 | 1/2002 | Rashidi |
| 2002/0039028 A1 | 4/2002 | Douglas et al. |
| 2002/0175814 A1 | 11/2002 | Wadlow et al. |
| 2003/0064732 A1 | 4/2003 | McDowell et al. |
| 2003/0064761 A1 | 4/2003 | Nevermann |
| 2003/0210203 A1 | 11/2003 | Phillips et al. |
| 2003/0214310 A1 | 11/2003 | McIntosh |
| 2003/0228846 A1 | 12/2003 | Berliner et al. |
| 2004/0021608 A1 | 2/2004 | Kojima et al. |
| 2004/0075613 A1 | 4/2004 | Jarmuszewski et al. |
| 2004/0108957 A1 | 6/2004 | Umehara et al. |
| 2004/0113847 A1 | 6/2004 | Qi et al. |
| 2004/0160378 A1 | 8/2004 | Abrams et al. |
| 2004/0222925 A1 | 11/2004 | Fabrega-Sanchez et al. |
| 2005/0017906 A1 | 1/2005 | Man et al. |
| 2005/0093624 A1* | 5/2005 | Forrester ............... H03G 3/001 330/129 |
| 2005/0184914 A1 | 8/2005 | Ollikainen et al. |
| 2006/0244663 A1 | 11/2006 | Fleck et al. |
| 2007/0037619 A1 | 2/2007 | Matsunaga et al. |
| 2007/0111681 A1 | 5/2007 | Alberth, Jr. et al. |
| 2007/0120745 A1 | 5/2007 | Qi et al. |
| 2007/0122307 A1 | 5/2007 | Da Costa et al. |
| 2008/0051165 A1 | 2/2008 | Burgan et al. |
| 2008/0055160 A1 | 3/2008 | Yong-Jin et al. |
| 2008/0158065 A1 | 7/2008 | Wee |
| 2008/0218493 A1 | 9/2008 | Patten et al. |
| 2008/0254836 A1 | 10/2008 | Qi et al. |
| 2009/0033562 A1 | 2/2009 | Takeuchi et al. |
| 2009/0047998 A1 | 2/2009 | Alberth, Jr. |
| 2009/0230884 A1 | 9/2009 | Van Doom |
| 2009/0253459 A1 | 10/2009 | Naganuma et al. |
| 2009/0295648 A1 | 12/2009 | Dorsey et al. |
| 2009/0305742 A1 | 12/2009 | Caballero |
| 2009/0325511 A1 | 12/2009 | Kim |
| 2010/0026664 A1 | 2/2010 | Geaghan |
| 2010/0052997 A1 | 3/2010 | Kan et al. |
| 2010/0056210 A1 | 3/2010 | Bychkov et al. |
| 2010/0067419 A1 | 3/2010 | Liu et al. |
| 2010/0113111 A1 | 5/2010 | Wong et al. |
| 2010/0234058 A1 | 9/2010 | Hu et al. |
| 2010/0234081 A1 | 9/2010 | Wong et al. |
| 2010/0279751 A1 | 11/2010 | Pourseyed et al. |
| 2010/0283671 A1 | 11/2010 | Levin et al. |
| 2010/0293691 A1 | 11/2010 | Xiaomeng et al. |
| 2010/0317302 A1 | 12/2010 | Greenwood et al. |
| 2010/0321325 A1 | 12/2010 | Springer et al. |
| 2011/0001675 A1 | 1/2011 | Lee |
| 2011/0012793 A1 | 1/2011 | Amm et al. |
| 2011/0012794 A1 | 1/2011 | Schlub et al. |
| 2011/0043408 A1 | 2/2011 | Shi et al. |
| 2011/0063042 A1 | 3/2011 | Mendolia et al. |
| 2011/0117973 A1 | 5/2011 | Asrani et al. |
| 2011/0124363 A1 | 5/2011 | Calvarese et al. |
| 2011/0157077 A1 | 6/2011 | Martin et al. |
| 2011/0199267 A1 | 8/2011 | Hayashi |
| 2011/0222469 A1 | 9/2011 | Ali et al. |
| 2011/0250928 A1 | 10/2011 | Schlub et al. |
| 2011/0298669 A1 | 12/2011 | Rao |
| 2012/0021707 A1 | 1/2012 | Forrester et al. |
| 2012/0021800 A1 | 1/2012 | Wilson et al. |
| 2012/0023225 A1 | 1/2012 | Imes et al. |
| 2012/0044115 A1 | 2/2012 | McCaughey et al. |
| 2012/0071195 A1 | 3/2012 | Chakraborty et al. |
| 2012/0074961 A1 | 3/2012 | Herrmann |
| 2012/0133561 A1 | 5/2012 | Konanur et al. |
| 2012/0147801 A1 | 6/2012 | Ho et al. |
| 2012/0164962 A1 | 6/2012 | Lin et al. |
| 2012/0172079 A1 | 7/2012 | Baldemair et al. |
| 2012/0178494 A1 | 7/2012 | Haim et al. |
| 2012/0190398 A1 | 7/2012 | Leukkunen |
| 2012/0214422 A1 | 8/2012 | Shi et al. |
| 2012/0223865 A1 | 9/2012 | Li et al. |
| 2012/0231784 A1 | 9/2012 | Kazmi |
| 2012/0270519 A1 | 10/2012 | Ngai et al. |
| 2012/0270592 A1 | 10/2012 | Ngai et al. |
| 2012/0276861 A1 | 11/2012 | Isobe et al. |
| 2012/0295554 A1 | 11/2012 | Greene et al. |
| 2012/0298497 A1 | 11/2012 | Maeda et al. |
| 2012/0299772 A1 | 11/2012 | Shtrom et al. |
| 2012/0315847 A1 | 12/2012 | Li et al. |
| 2012/0329517 A1 | 12/2012 | Elin |
| 2012/0329524 A1 | 12/2012 | Kent et al. |
| 2013/0005413 A1 | 1/2013 | Brogle et al. |
| 2013/0016621 A1 | 1/2013 | Kil et al. |
| 2013/0026846 A1 | 1/2013 | Gianesello et al. |
| 2013/0033400 A1 | 2/2013 | Chiang |
| 2013/0045700 A1 | 2/2013 | Stallman et al. |
| 2013/0050046 A1 | 2/2013 | Jarvis et al. |
| 2013/0051261 A1 | 2/2013 | Kazmi et al. |
| 2013/0060517 A1 | 3/2013 | Sanchez |
| 2013/0120257 A1 | 5/2013 | Park et al. |
| 2013/0122827 A1 | 5/2013 | Ali et al. |
| 2013/0127677 A1 | 5/2013 | Lin et al. |
| 2013/0137487 A1 | 5/2013 | Sato |
| 2013/0149957 A1 | 6/2013 | Desclos et al. |
| 2013/0157564 A1 | 6/2013 | Curtis et al. |
| 2013/0169348 A1 | 7/2013 | Shi |
| 2013/0178167 A1 | 7/2013 | Lockerbie et al. |
| 2013/0178174 A1 | 7/2013 | Geris et al. |
| 2013/0203363 A1 | 8/2013 | Gratt et al. |
| 2013/0210477 A1 | 8/2013 | Peter |
| 2013/0217342 A1 | 8/2013 | Abdul-gaffoor et al. |
| 2013/0241670 A1 | 9/2013 | Mikhemar et al. |
| 2013/0278474 A1 | 10/2013 | Lenormand et al. |
| 2013/0293244 A1 | 11/2013 | Leek |
| 2013/0300618 A1 | 11/2013 | Yarga et al. |
| 2013/0310105 A1 | 11/2013 | Sagae et al. |
| 2013/0310106 A1 | 11/2013 | Wang et al. |
| 2013/0314365 A1 | 11/2013 | Woolley et al. |

(56) References Cited

U.S. PATENT DOCUMENTS

| | | | |
|---|---|---|---|
| 2013/0335291 A1 | 12/2013 | Judson et al. | |
| 2014/0015595 A1 | 1/2014 | Van Ausdall et al. | |
| 2014/0021801 A1 | 1/2014 | Kao et al. | |
| 2014/0071008 A1 | 3/2014 | Desclos et al. | |
| 2014/0078094 A1 | 3/2014 | Yang | |
| 2014/0087663 A1 | 3/2014 | Burchill et al. | |
| 2014/0098491 A1 | 4/2014 | Wang | |
| 2014/0098693 A1 | 4/2014 | Tabet et al. | |
| 2014/0066124 A1 | 5/2014 | Novet | |
| 2014/0128032 A1 | 5/2014 | Muthukumar | |
| 2014/0139380 A1 | 5/2014 | Ouyang et al. | |
| 2014/0141733 A1 | 5/2014 | Wong et al. | |
| 2014/0152121 A1 | 6/2014 | Ku | |
| 2014/0155000 A1 | 6/2014 | Erkens | |
| 2014/0159980 A1 | 6/2014 | Finegold | |
| 2014/0173269 A1 | 6/2014 | Varoglu et al. | |
| 2014/0176938 A1 | 6/2014 | Yang et al. | |
| 2014/0206297 A1* | 7/2014 | Schlub | H01Q 1/243 455/77 |
| 2014/0274188 A1 | 9/2014 | Thorson | |
| 2014/0274189 A1 | 9/2014 | Moller et al. | |
| 2014/0280450 A1 | 9/2014 | Luna | |
| 2014/0292587 A1 | 10/2014 | Yarga et al. | |
| 2014/0307570 A1 | 10/2014 | Hong | |
| 2014/0315592 A1* | 10/2014 | Schlub | H04B 1/3838 455/522 |
| 2014/0357207 A1 | 12/2014 | Ma | |
| 2014/0357313 A1 | 12/2014 | Mercer et al. | |
| 2014/0370929 A1 | 12/2014 | Khawand et al. | |
| 2015/0031408 A1 | 1/2015 | Kalla et al. | |
| 2015/0053575 A1 | 2/2015 | Bridges et al. | |
| 2015/0141080 A1 | 5/2015 | Standing | |
| 2015/0169093 A1 | 6/2015 | Nakao | |
| 2015/0177371 A1* | 6/2015 | Abbasi | G01S 13/02 342/174 |
| 2015/0199042 A1 | 7/2015 | Standing et al. | |
| 2015/0200444 A1 | 7/2015 | Mercer et al. | |
| 2015/0201387 A1 | 7/2015 | Khawand et al. | |
| 2015/0288074 A1 | 10/2015 | Harper et al. | |
| 2015/0382307 A1 | 12/2015 | Harper et al. | |
| 2016/0049978 A1 | 2/2016 | Mercer et al. | |
| 2016/0098053 A1 | 4/2016 | Khawand et al. | |
| 2016/0164563 A1 | 6/2016 | Khawand et al. | |
| 2016/0064801 A1 | 7/2016 | Lee et al. | |
| 2016/0204836 A1 | 7/2016 | Lee et al. | |

FOREIGN PATENT DOCUMENTS

| | | |
|---|---|---|
| CN | 100504407 C | 9/2006 |
| CN | 102064812 A | 5/2011 |
| CN | 102077234 A | 5/2011 |
| CN | 202276339 U | 6/2012 |
| CN | 102714346 A | 10/2012 |
| CN | 102835036 A | 12/2012 |
| CN | 103248747 A | 8/2013 |
| EP | 843421 | 5/1998 |
| EP | 1298809 | 4/2003 |
| EP | 1469550 A3 | 12/2004 |
| EP | 1732167 A1 | 12/2006 |
| EP | 2015548 B1 | 2/2010 |
| EP | 2276108 A1 | 1/2011 |
| EP | 2381527 A1 | 10/2011 |
| EP | 2383364 | 11/2011 |
| EP | 2405534 A1 | 1/2012 |
| EP | 2410661 | 1/2012 |
| EP | 2509229 A1 | 10/2012 |
| EP | 2568605 A1 | 3/2013 |
| EP | 2787780 A1 | 10/2014 |
| GB | 2380359 | 4/2003 |
| GB | 2409345 A | 6/2005 |
| JP | 2002043957 A | 2/2002 |
| JP | 2007194995 A | 8/2007 |
| WO | 200042797 | 7/2000 |
| WO | 200148858 A3 | 7/2001 |
| WO | 2004015813 A1 | 2/2004 |
| WO | 2004091046 A1 | 10/2004 |
| WO | 20050018046 A1 | 2/2005 |
| WO | 2007043150 A1 | 4/2007 |
| WO | 2009149023 A1 | 12/2009 |
| WO | 2011055154 A1 | 5/2011 |
| WO | 2011058128 A1 | 5/2011 |
| WO | 2012152103 A1 | 2/2012 |
| WO | 2012061582 | 5/2012 |
| WO | 2012091651 | 7/2012 |
| WO | 2012113754 | 8/2012 |
| WO | 2012122113 A1 | 9/2012 |
| WO | 2012122116 | 9/2012 |
| WO | 2012143936 | 10/2012 |
| WO | 2012176217 A1 | 12/2012 |
| WO | 2013011352 A1 | 1/2013 |
| WO | 2013101106 | 7/2013 |
| WO | 2013103948 | 7/2013 |
| WO | 2013141791 A1 | 9/2013 |
| WO | 2013165419 | 11/2013 |
| WO | 2013169527 A1 | 11/2013 |
| WO | 2014036532 A1 | 3/2014 |
| WO | 2015134117 A1 | 9/2015 |
| WO | 2016111897 A1 | 7/2016 |

OTHER PUBLICATIONS

Mrazovac, et al.,"Reaching the Next Level of Indoor Human Presence Detection: An RF Based Solution", In Proceedings of International Conference on Telecommunication in Modern Satellite, Cable and Broadcasting Services, vol. 1, Oct. 16, 2013, pp. 297-300.

"Digital, Silicon Microphone has 2.6 X 1.6 $mm^2$ Footprint", Published on: Dec. 12, 2005, Available at: http://news.thomasnet.com/fullstory/Digital-Silicon-Microphone-has-2-6-x-1-6-mm-footprint-471386.

Holopainen, et al., "Broadband Equivalent Circuit Model for Capacitive Coupling Element-Based Mobile Terminal Antenna", In IEEE Antennas and Wireless Propagation Letters, vol. 9, Jul. 8, 2010, 4 pages.

Ozyalcin, et al., "SAR Simulations in Wireless Communication and Safety Discussions in the Society", In Proceedings of Turkish Journal of Electrical Engineering & Computer Sciences, vol. 10, Issue 2, Dec. 31, 2013, 16 pages.

U.S. Appl. No. 13/905,088, Mercer, et al. "Specific Absorption Rate Mitigation", filed May 29, 2013.

"Low SAR Solution for Tablet PC", Published on: Sep. 27, 2011, Available at: http://www.auden.com.tw/TRC/webspace/disk/AudenSARSolutiondatasheet_110927.pdf.

"Semtech Launches Smart Proximity Sensor for Short-Range Human Presence Detection & SAR Regulations in Mobile & Tablet PC Applications", Published on: Jul. 24, 2012, Available at: http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html.

Toit, Riaan Du, "Using Proximity Sensing to Meet Mobile Device FCC SAR Regulations", Published on: Apr. 17, 2012, Available at: http://www.eetimes.com/General/PrintView/4371201.

International Seraching Authority, U.S. Patent and Trademark Office, International Search Report and Written Opinion for PCT/US2015/062851, dated Jan. 28, 2016, mailed Feb. 5, 2016, 11 pages.

International Preliminary Examining Authority, International Preliminary Report on Patentability for PCT/US2014/065856, date mailed: Feb. 10, 2016, 8 pages.

International Preliminary Examining Authority, Second Written Opinion of the International Preliminary Examining Authority for PCT/2014/065856, mailed Oct. 13, 2015, 6 pages.

Khawand, et al., "Radio Frequency (RF) Power Back-Off Optimization for Specific Abdorption Rate (SAR) Compliance", U.S. Appl. No. 13/918,846, filed Jun. 14, 2013, 40 pages.

Mercer, et al., "Specific Absorption Rate Mitigation", U.S. Appl. No. 13/905,088, filed May 19, 2013, 53 pages.

(56) References Cited

OTHER PUBLICATIONS

U.S. Appl. No. 13/918,846, Pai, et al., "Radio Frequency (RF) Power Back-Off Optimization for Specific Absorption Rate (SAR) Compliance", filed Jun. 14, 2013.
International Searching Authority, United States Patent and Trademark Office, International Search Report and Written Opinion for Application No. PCT/US2014/042023, dated Aug. 29, 2014, 11 Pages.
International Searching Authority, United States Patent and Trademark Office, International Search Report and Written Opinion for Application No. PCT/US2014/039479, dated Sep. 19, 2014, 11 Pages.
International Searching Authority, United States Patent and Trademark Office, International Search Report and Written Opinion for Application No. PCT/US2014/072411, dated Mar. 27, 2015, 10 Pages.
International Searching Authority, United States Patent and Trademark Office, International Search Report and Written Opinion for Application No. PCT/US2014/072414, dated Apr. 14, 2015, 9 Pages.
"Non-Final Office Action", U.S. Appl. No. 13/905,088, dated Mar. 23, 2015, 37 pages.
"Non-Final Office Action", U.S. Appl. No. 14/152,351, dated Feb. 20, 2015, 9 pages.
"Second Written Opinion", Application No. PCT/US2014/042023, dated Mar. 2, 2015, 6 Pages.
International Searching Authority, U.S. Patent and Trademark Office, International Search Report for PCT/US2014/072411, dated Mar. 20, 2015, 4 pages.
International Searching Authority, U.S. Patent and Trademark Office, Written Opinion for PCT/US2014/072411, dated Mar. 27, 2015, 6 pages.
I.B. Bonev et al, "Parmetric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.
J. Poutanen, "Interaction Between Mobile Terminal Antenna and User" Helsinki University of Technology Master's Thesis, Oct. 9, 2007, 100 pages.
Sterner, et al., "Development of an Antenna Sensor for Occupant Detection in Passenger Transportation", In Proceedings of Procedia Engineering, vol. 47, Sep. 9, 2012, 6 pages.
Poutanent, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
Curto, et al., "Circular Loop Antenna Operating at 434 MHz for Medical Applications: Loop-Tissue Interaction", In Proceeding of: Irish Signals and Systems Conference, Jul. 2006, 6 pages.
International Searching Authority, U.S. Patent and Trademark Office, Updated Search Report for PCT/US2014/072412, dated Oct. 5, 2015, 3 pages.
International Searching Authority, U.S. Patent and Trademark Office, Updated Written Opinion for PCT/US2014/072412, dated Oct. 5, 2015, 8 pages.
International Searching Authority, U.S. Patent and Trademark Office, Search Report and Written Opinion for PCT/US2014/072413, dated Jul. 16, 2015, 16 pages.
"SAR Evaluation Considerations for Laptop, Notebook, Netbook and Tablet Computers," Federal Communications Commission Office of Engineering and Technology Laboratory Division, May 28, 2013, 14 pages.
Hochwald, et al "Minimizing Exposure to Electromagnetic Radiation in Portable Devices", In Proceedings of Information Theory and Applications Workshop, Feb. 5, 2012, pp. 107.
International Searching Authority, United States Patent and Trademark Office, International Preliminary Report on Patentability, Application No. PCT/US2014/039479, dated Jun. 15, 2015, 8 pages.
International Searching Authority, United States Patent and Trademark Office, Second International Search Report and Written Opinion for PCT/US2014/072412; dated Oct. 5, 2015, 11 pages.
Myllymaki, Sami "Capacitive Antenna Sensor for Proximity Recognition"; http://herkules.oulu.fi/isbn9789514299155/isbn9789514299155.pdf, dated Nov. 30, 2012, 60 pages.
International Searching Authority, United States Patent and Trademark Office, Search Report and Written Opinion for PCT/US2014/065856, dated Feb. 4, 2015, 10 pages.
International Searching Authority, United States Patent and Trademark Office, Second Written Opinion of IPEA for PCT/US2014/065856, dated Oct. 13, 2015, 6 pages.
International Searching Authority, U.S. Patent and Trademark Office, International Search Report and Written Opinion PCT/US2015/037563, dated Aug. 20, 2015, mailed Aug. 31, 2015, 11 pages.
International Searching Authority, U.S. Patent and Trademark Office,Written Opinion of International Preliminary Examining Authority for PCT/US2014/072412, dated Dec. 4, 2015, 5 pages.
International Searching Authority, U.S. Patent and Trademark Office, Written Opinion of the International Preliminary Examining Authority for PCT/US2014/072413 dated Dec. 17, 2015, 6 pages.
"International Preliminary Report on Patentability Issued in PCT Application No. PCT/US2014/072412", dated Mar. 22, 2016, 7 Pages.
International Searching Authority, U.S. Patent and Trademark Office, International Search Report and Written Opinion for PCT/US2015/052769, dated Feb. 17, 2016, 27 pages.
International Preliminary Examining Authority, International Preliminary Report on Patentability for PCT/US2014/072411; dated Mar. 23, 2016, 8 pages.
"Non-Final Office Action", U.S. Appl. No. 14/152,652, dated Apr. 18, 2016 9 pages.
"Final Office Action Issued in U.S. Appl. No. 14/927,287", dated May 11, 2016, 34 Pages.
"Final Office Action", U.S. Appl. No. 14/086,866, dated May 19, 2016, 7 pages.
International Preliminary Examining Authority, International Preliminary Report on Patentability for PCT/US2014/072413; dated Mar. 24, 2016, 7 pages.
Second Written Opinion Issued in PCT Application No. PCT/US2014/072413, dated Dec. 17, 2015, 6 Pages.
Mercer, et al., "Dynamic Antenna Power Control for Multi-Context Device", U.S. Appl. No. 14/987,964, filed Jan. 5, 2016, 52 pages.
"Non-Final Office Action", U.S. Appl. No. 14/152,652, dated Jan. 5, 2016, 29 pages.
"Non-Final Office Action", U.S. Appl. No. 14/152,086, dated Jul. 22, 2015, 13 pages.
"Non-Final Office Action", U.S. Appl. No. 13/918,846, dated Sep. 23, 2015, 16 pages.
"Non-Final Office Action", U.S. Appl. No. 14/152,086, dated Nov. 30, 2015, 19 pages.
"Non-Final Office Action", U.S. Appl. No. 14/562,212, dated Dec. 18, 2015, 16 pages.
"Non-Final Office Action", U.S. Appl. No. 14/927,287, dated Dec. 21, 2015, 28 pages.
"Non-Final Office Action", U.S. Appl. No. 14/152,652, dated Dec. 23, 2015, 9 pages.
"Non-Final Office Action", U.S. Appl. No. 14/320,320, dated Jan. 21, 2016, 9 pages.
Office Action Issued in United Kingdom Patent Application No. 12190963, dated Jan. 28, 2016, 4 Pages.
"Final Office Action", U.S. Appl. No. 13/918,846, dated Mar. 2, 2016, 20 pages.
Office Action Issued in Chinese Patent Application No. 201380055749.X, dated Jun. 6, 2016, 12 Pages.
"Non-Final Office Action", U.S. Appl. No. 13/918,846, dated Jun. 14, 2016, 21 pages.
"Final Office Action", U.S. Appl. No. 14/562,212, dated Jun. 17, 2016, 17 pages.
"Non-Final Office Action", U.S. Appl. No. 14/506,478, dated Jul. 1, 2016, 10 pages.

(56) References Cited

OTHER PUBLICATIONS

International Searching Authority, United States Patent and Trademark Office, International Search Report and Written Opinion for Application No. PCT/US2013/066441, dated Dec. 12, 2013, 12 Pages.
International Preliminary Examining Authority, United States Patent and Trademark Office, International Preliminary Report on Patentability, Application No. PCT/US2013/066441, dated May 7, 2015, 9 pages.
International Searching Authority, U.S. Patent and Trademark Office, Secrond Written Opinion of the International Preliminary Examining Authority for PCT/US2014/072414 dated Dec. 9, 2015, 29 pages.
International Preliminary Examining Authority, International Preliminary Report on Patentability for PCT/US2014/072414; dated Mar. 23, 2016, 7 pages.
International Preliminary Examining Authority, Second Written Opinion of the International Preliminary Examining Authority for PCT/2015/037563, dated Jun. 1, 2016, 5 pages.
"Final Office Action", U.S. Appl. No. 14/320,320, dated Jul. 29, 2016, 10 pages.
Second Written Opinion Issued in PCT Application No. PCT/US2014/072411, dated Nov. 26, 2015, 7 Pages.
Second Written Opinion Issued in PCT Application No. PCT/US2015/052769, dated Jul. 7, 2016, 5 Pages.
"Non-Final Office Action", U.S. Appl. No. 14/086,866, dated Oct. 17, 2016, 7 pages.
"Final Office Action", U.S. Appl. No. 13/918,846, Oct. 26, 2016, 25 pages.
Office Action Issued in Columbian Patent Application No. NC2016/0000122, dated Aug. 19, 2016, 2 Pages.
Office Action and Search Report Issued in Chinese Patent Application No. 201480031132.9, dated Nov. 2, 2016, 10 Pages.
International Preliminary Examining Authority, International Preliminary Report on Patentability for PCT/US2015/037563, dated Sep. 13, 2016, 11 pages.
International Preliminary Examining Authority, International Preliminary Report on Patentability for PCT/US2015/052769, dated Sep. 20, 2016, 16 pages.
Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan. 2015, 8 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN639.pdf, Retrieved on: Nov. 17, 2016, 28 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Osoinach, Bryce, "Proximity Capacitive Sensor Technology for Touch Sensing Applications", In White Paper of Proximity Sensing, 2007, 7 pages.
Pal, et al., "A low-profile switched-beam dual-band capacitively coupled Square Loop Antenna", In Proceedings of Antennas and Propagation Conference, Nov. 11, 2013, 5 Pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Quddious, et al., "An inkjet printed meandered dipole antenna for RF passive sensing applications", In Proceedings of 10th European Conference on Antennas and Propagation, Apr. 2016, 4 Pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages.
Harper, "Loop Antenna With Integrated Proximity Sensing", U.S. Appl. No. 15/412,997, filed Jan. 23, 2016, 32 pages.
"Non-Final Office Action", U.S. Appl. No. 14/987,964, dated Nov. 30, 2016, 8 pages.
Office Action and Search Report Issued in Chinese Patent Application No. 201480033869.4, dated Dec. 19, 2016, 7 Pages.
"Second Office Action Issued in Chinese Patent Application No. 201380055749.X", dated Jan. 25, 2017, 10 Pages.
"Second Written Opinion Issued in PCT Application No. PCT/US2015/062851", dated Oct. 28, 2016, 8 Pages.
Office Action and Search Report Issued in Chinese Patent Application No. 201480063903.02, dated Apr. 19, 2019, 11 Pages.
International Preliminary Examining Authority, International Preliminary Report on Patentability for PCT/US2015/062851, dated Feb. 22, 2017, 19 pages.
International Searching Authority, U.S. Patent and Trademark Office, International Search Report and Written Opinion for PCT/US2016/069056, dated Mar. 31, 2017, 17 pages.
"Office Action Issued in Chinese Patent Application No. 201380055749.X", dated Jun. 12, 2017, 8 Pages.
Second Office Action and Search Report Issued in Chinese Patent Application No. 201480031132.9, dated Jul. 26, 2017, 12 Pages.

* cited by examiner

ANTENNA COUPLING FOR SENSING AND DYNAMIC TRANSMISSION

BACKGROUND

Consumer electronic devices may be equipped with wireless communication circuitry that makes use of radio frequency (RF) electromagnetic fields. For example, the wireless communications circuitry may transmit and receive RF signals in mobile telephone RF bands, WiFi network RF bands, GPS RF bands, etc. To protect humans from harmful levels of RF radiation when using such devices, government agencies have imposed regulations limiting RF transmission power from some wireless electronic devices, such as tablet computers and mobile phones. However, reducing RF transmission power can appreciably decrease performance of device features in some electronic devices.

SUMMARY

Implementations described and claimed herein address the foregoing by providing a wireless transmission system that adjusts transmission power of a carrier wave responsive to a detected change in signal strength of the carrier wave at a receiver. To satisfy government-imposed RF transmission limitations without significantly compromising device performance, electronic devices can include sensors that allow for adjustable signal strength of a transmitted RF carrier wave. For example, the signal strength of a transmitted RF carrier may be dynamically reduced when a proximity sensor detects a human or other dielectric body in close proximity of the carrier wave transmission source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

In some jurisdictions, specific absorption rate (SAR) standards are in place that impose maximum energy absorption limits on electronic device manufacturers. These standards impose restrictions on the amount of electromagnetic radiation that may be emitted at any particular point within a given distance of a transmitting radio frequency (RF) antenna. Particular attention is given to radiation limits at distances within a few centimeters from the device (e.g., 0-3 centimeters), where users are likely to place a human body part near the transmitting antenna. Such restrictions may be satisfied by reducing transmitted carrier signal strength when a dielectric body (e.g., a human body part) is detected in the proximity of the transmitter.

Implementations of the disclosed technology provide an electronic device that dynamically alters the power of a transmitted carrier wave responsive to detected changes in the signal strength of the carrier wave received at a nearby receiver. A user in proximity of the electronic device influences the transmitted carrier wave in a detectable manner, allowing for the dynamic power alteration that ensures compliance with SAR standards without significantly compromising performance of the electronic device.

Figure 1:
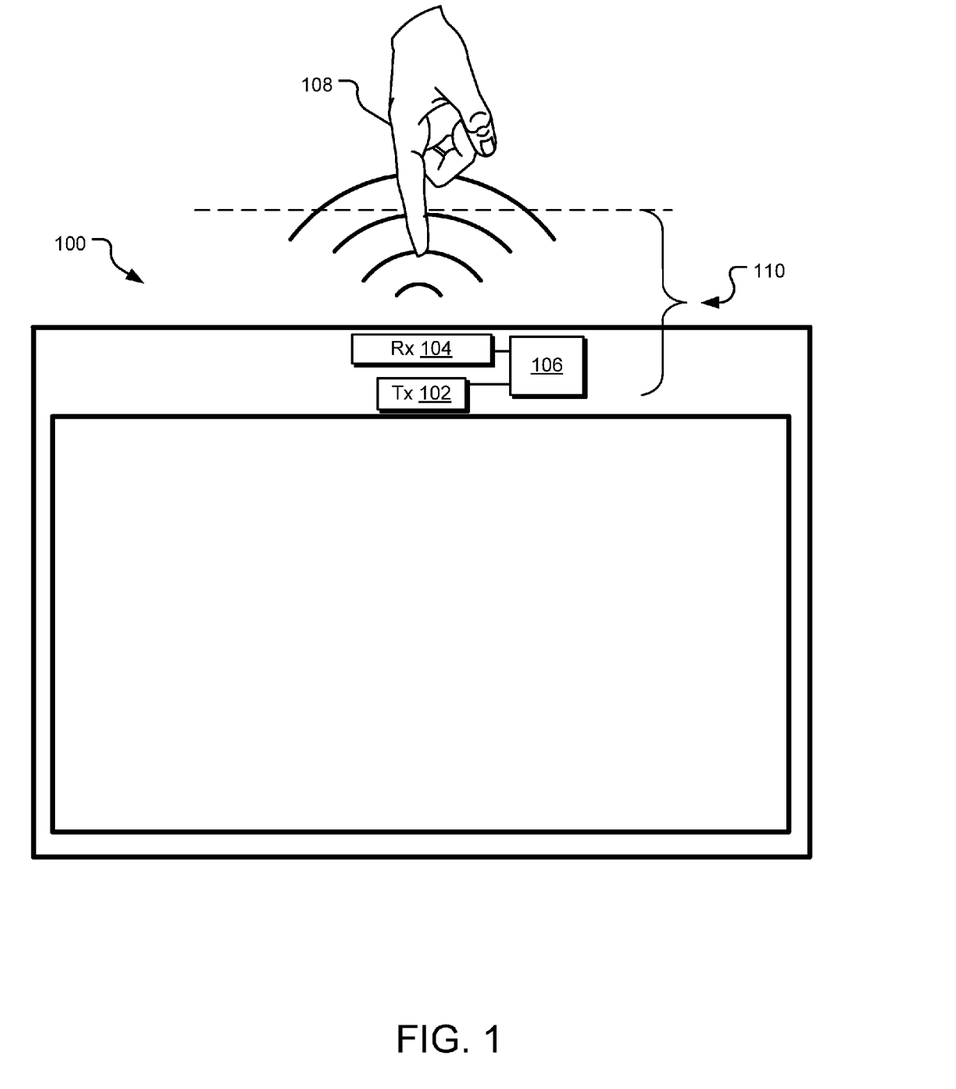
FIG. 1 illustrates an example electronic device that provides for dynamic power adjustment of a transmitted carrier wave responsive to a detected change in signal strength of the carrier wave at a receiver.

FIG. 1 illustrates an example electronic device 100 that provides for dynamic power adjustment of a transmitted carrier wave responsive to a detected change in signal strength of the carrier wave at a receiver. The electronic device 100 may be without limitation a tablet computer, laptop, mobile phone, personal data assistant, cell phone, smart phone, Blu-Ray player, gaming system, wearable computer, or any other device including wireless communications circuitry for transmission of an RF carrier wave. The electronic device 100 includes an RF transmitter 102 (including a transmitting antenna) that transmits a carrier wave. In one implementation, the carrier wave has a frequency in the range of a mobile telephone RF transmission (e.g., several hundred megahertz (MHz)). Other implementations are also contemplated. In the illustrated implementation, the electronic device 100 represents a tablet computer having mobile telephone RF capabilities.

The electronic device also includes a RF receiver 104 (including a receiving antenna) that is capable of detecting wireless transmissions in a frequency range that includes the carrier wave transmitted by the RF transmitter 102. In one implementation, the RF transmitter 102 represents an active antenna radiating at a mobile telephone RF frequency, and the RF receiver 104 represents a parasitic antenna positioned relative to the RF transmitter 102. For example, the RF receiver 104 may be positioned between the RF transmitter 102 and an exterior surface of the electronic device 100, positioned at the surface of the electronic device 100, and/or positioned in close proximity to the RF transmitter 102). In this manner, the RF receiver 104 is excited in the presence of the RF signal (e.g., the carrier wave) emanating from the RF transmitter 102. Other frequencies may be employed in a similar configuration.

The reception of the signal from the RF transmitter 102 by the RF receiver 104 may be influenced by the proximity of a dielectric body (e.g., a human body part) to the RF receiver 104. This influence results from the presence of the dielectric body within the RF field emanating from the RF transmitter 102, wherein the dielectric body alters the coupling between the RF receiver 104 and RF transmitter 102. By setting a baseline signal strength level for the carrier wave transmitted by the RF transmitter 102 and received by the RF receiver 104 (e.g., in the absence of any external dielectric body in the proximity of the RF transmitter 102), changes in received carrier wave signal strength received by the RF receiver 104 can be detected, referred to herein as a "carrier wave signal strength delta." The carrier wave signal strength delta may be caused by the encroachment of a dielectric body 108 within the coupling distance 110 of the RF transmitter 102. In one implementation, the RF receiver 104 measures a moving threshold that is proportional to the current and active transmission power.

The RF receiver 104 is connected to an RF power detector 106 that provides an electrical feedback path between the RF receiver 104 and the RF transmitter 102. If the carrier wave signal strength delta exceeds a predetermined threshold, the RF power detector 106 can determine that a dielectric body 108 is in proximity to the RF transmitter 102. In addition, the RF power detector 106 includes control circuitry to vary behavior (e.g., output power level, output wave frequency, etc.) of the RF transmitter 102 in response to changes in the carrier wave signal (e.g., signal strength) detected by the RF receiver 104. Therefore, if the RF power detector 106 determines that a dielectric body 108 is in proximity to the RF transmitter 102, the RF power detector 106 can signal the RF transmitter 102 to reduce its transmission power in an effort to comply with SAR standards.

The RF power detector 106 may be configured to adjust other characteristics of the signal transmitted by the RF transmitter 102, such as decreasing the carrier signal frequency of the transmitted signal. A reduced carrier frequency may result in a decreased SAR. The RF power detector 106 may be configured to detect other characteristics in the signal received by the RF receiver 104 as compared to the signal transmitted by the RF transmitter 102. For example, the RF power detector 106 may detect the other frequency components and/or sinusoids having different phases in the signal received by the RF receiver 104 that may differ from those of the signal transmitted by the RF transmitter 102. The RF power detector 106 may use this information to perform SAR-related functions, such as determining SAR due to the combined power of the RF transmitter 102 and the power of a nearby transmitter in the same device 104 or one or more different devices. In this manner, SAR-related transmission power reductions may be based on a detection of overall SAR attributed to the device 100 and/or neighboring devices. Alternatively, the RF power detector 104 may filter spurious signal components at frequencies differing from the frequencies of the carrier signal transmitted by the RF transmitter 104.

After altering a behavior of the RF transmitter 102, the RF power detector 106 continues to monitor the carrier wave signal strength received by the RF receiver 104. If the dielectric body 108 begins to move away from the electronic device 100, the energy coupling between the RF transmitter 102 and the RF receiver 104 is changes to return the received carrier wave signal strength to the baseline carrier signal strength.

In the above manner, a behavior of the RF transmitter 102 (e.g., output power) is altered responsive to detection of a dielectric body within the coupling distance 110 of the RF transmitter 102. Because the RF receiver 104 detects the transmitted carrier wave of the electronic device 100 rather than a secondary signal, proximity sensing is achieved without supplying power to a secondary sensing source, thereby reducing total power consumption of the electronic device 100.

Additionally, the RF receiver 104 may be physically smaller than a proximity sensor based on self-capacitance because the disclosed sensing technology may rely less on between the surface areas of components in the electronic device 100. Therefore, the electronic device 100 provides for a reduction in component size and increased design flexibility (e.g., antenna placement options).

Figure 2:
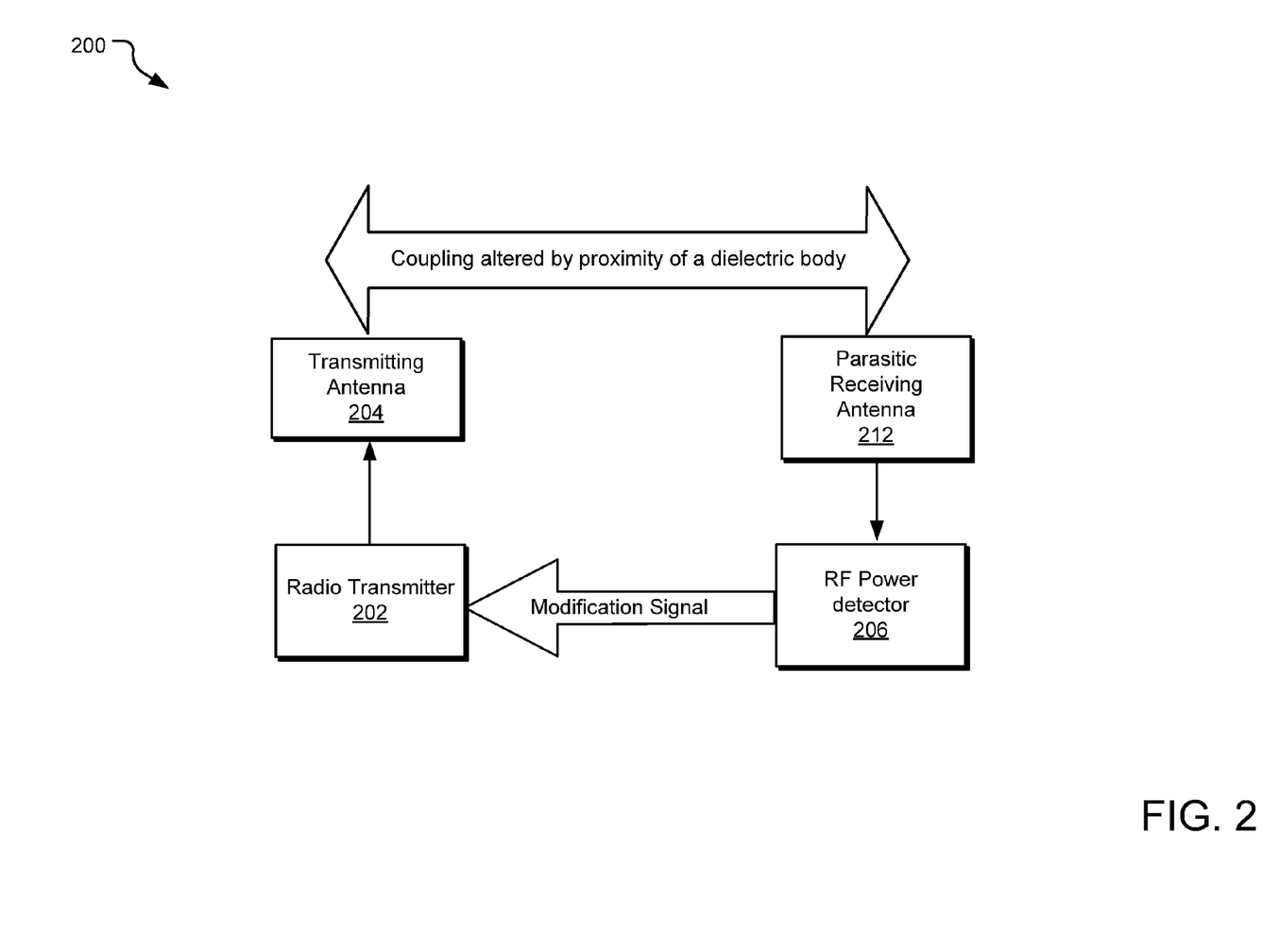
FIG. 2 illustrates example electrical components and data flows for a wireless transmission system with a mechanism for dynamic transmission power adjustment.

FIG. 2 illustrates example electrical components and data flows for a wireless transmission system 200 with a mechanism for dynamic transmission power adjustment. The wireless transmission system 200 includes an RF transmitter 202 that generates a carrier wave, such as a mobile telephone RF signal. The RF transmitter 202 is coupled to a transmitting antenna 204 that wirelessly transmits the carrier wave. The transmitting antenna 204 may be embedded within, positioned beneath, or located on a surface of an electronic device. Other implementations may also be employed.

The wireless transmission system 200 includes a parasitic receiving antenna 212 coupled to an RF power detector 206. The parasitic receiving antenna 212 receives an RF carrier signal transmitted by the transmitting antenna 204. The parasitic receiving antenna 212 conducts the received carrier signal to the RF power detector 206, which provides an electrical feedback path to the RF transmitter 202, allowing for dynamic modification of behavior of the RF transmitter 202 to reduce a human health risk posed by the carrier wave signal strength. This behavior modification of the RF transmitter 202 may be achieved in a number of ways, such as through a digital logic control line, a communication signal over a digital communication interface bus, or analog feedback mechanisms.

When a dielectric body, such as a human, approaches within a coupling distance of the transmitting antenna 204, the dielectric body influences an energy coupling between the transmitting antenna 204 and the parasitic receiving antenna 212. Consequently, the signal strength of the carrier wave changes at the parasitic receiving antenna 212. The RF power detector 206 detects this change in carrier wave signal strength from the baseline carrier wave signal strength. The change is referred to as the "carrier wave signal strength delta." If the carrier wave signal strength delta detected by the parasitic receiving antenna and communicated to the RF power detector 206 exceeds a threshold power change condition, the RF power detector 206 signals the RF transmitter 202 to reduce its transmission power in order to reduce a radiation health risk posed by the carrier wave.

When the dielectric body begins to move away from the transmitting antenna 204, the energy coupling between the transmitting antenna 204 and the parasitic receiving antenna 212 begins to return to the base line carrier wave signal strength (i.e., reducing the carrier wave signal strength delta). If the carrier wave signal strength delta of the received carrier wave drops back below the threshold power change condition, the RF power detector 206 increases the transmission power of the RF transmitter 202 to the original transmission power level. The original transmission power may be determined based on standard operating procedures and protocols defined in wireless standard and/or based on communications received by the wireless transmission system 200 from a base station or other control entity in communication with the wireless transmission system 200. The wireless transmission system 200 may advantageously maintain a modification signal that results in a reduced impact on the transmitted signal, such that only the minimum amount of reduction from the original transmission power level is needed to comply with given SAR requirements.

The RF power detector 206 may store or have access to a number of different threshold power change conditions. Depending on the particular threshold power change condition satisfied, the RF power detector 206 may modify behavior of the RF transmitter 202 differently. For example, the RF power detector 206 may be capable of increasing or decreasing transmission power of the RF transmitter 202 by a variety of different magnitudes, depending on the carrier wave signal strength delta of the received carrier wave.

In some implementations, multiple parasitic receiving antennas may be placed in pre-defined locations around the transmitting antenna 204 to improve detection of a proximal object.

Figure 3:
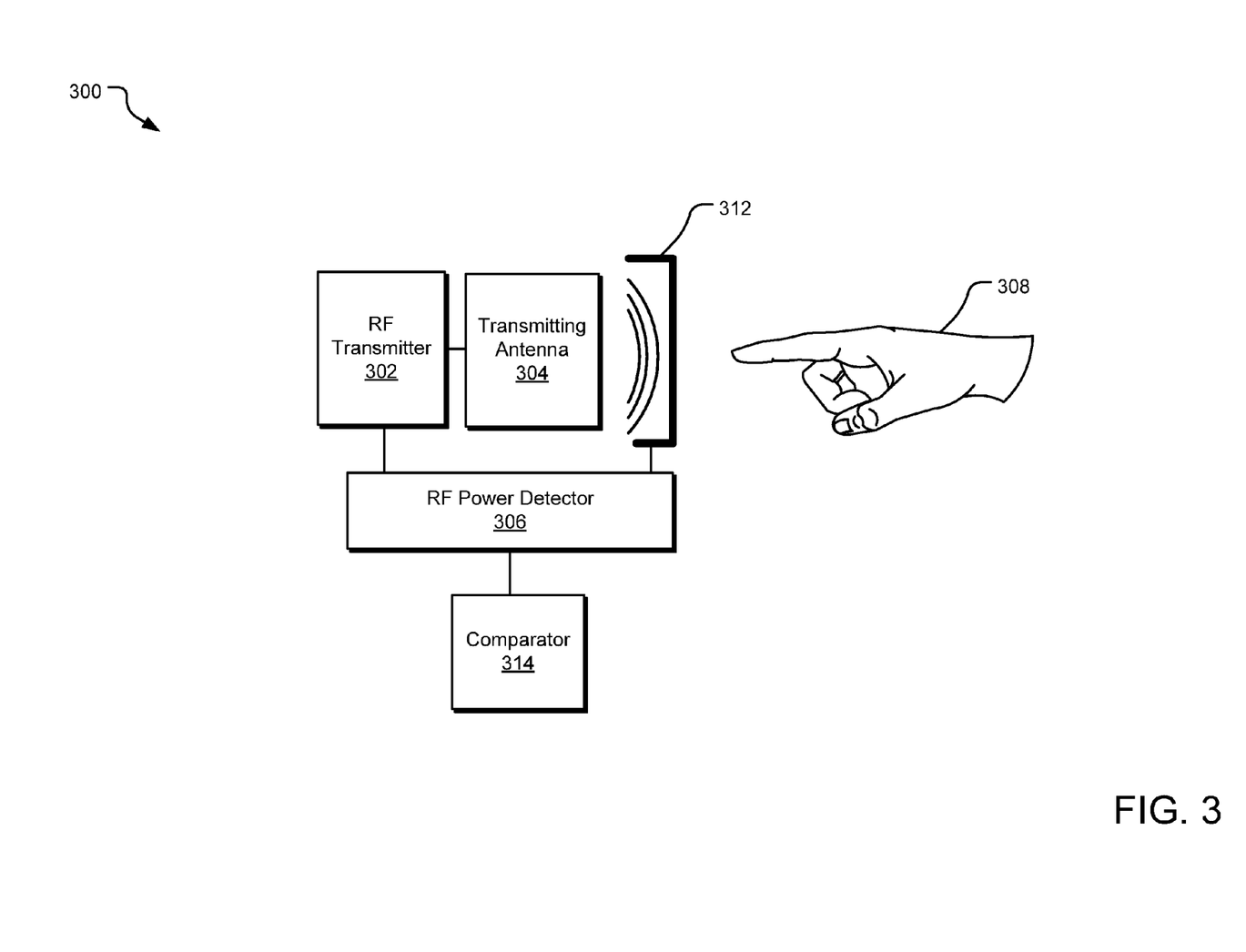
FIG. 3 illustrates example electrical components and data flows for a wireless transmission system with dynamic transmission power adjustment.

FIG. 3 illustrates example electrical components and data flows for a wireless transmission system 300 with dynamic transmission power adjustment. The wireless transmission system 300 includes an RF transmitter 302 that generates a carrier wave, such as a mobile telephone RF signal. The RF transmitter 302 is coupled to a transmitting antenna 304 that wirelessly transmits the carrier wave. The wireless transmission system 300 further includes a parasitic receiving antenna 312 coupled to an RF power detector 306. The RF power detector 306 provides an electrical feedback path to the RF transmitter 302, which allows for modification of behavior of the RF transmitter 302 to reduce a human health risk posed by the carrier wave.

One or both of the RF transmitter 302 and the transmitting antenna 304 may be positioned on an external surface of an electronic device or embedded within or below the casing of the electronic device. In FIG. 3, the parasitic receiving antenna 312 substantially overlies the transmitting antenna 304 such that the parasitic receiving antenna 312 is closer to a device exterior than the transmitting antenna 304. In this implementation, the carrier wave is transmitted away from the transmitting antenna 304 in a direction through the parasitic receiving antenna 312. In another implementation, the parasitic receiving antenna 312 and the transmitting antenna 304 are side-by-side on the surface of an electronic device. In yet another implementation, the parasitic receiving antenna 312 and the transmitting antenna 304 are embedded within the electronic device and relatively equidistant from the device exterior. Many other configurations of RF transmitter and one or more parasitic receiving antennas may be employed. The transmitting antenna 304 and the parasitic receiving antenna 312 may be arranged relative to each other such that a bulk of electric field lines flowing from the transmitting antenna 304 to the parasitic receiving antenna 312 flow through a space through which a dielectric body, such as a human hand, may pass during use of the wireless transmission system 300. Such an arrangement may advantageously provide proximity sensing system with a higher dynamic range and/or increased sensitivity. For example, a wireless transmission system range may have a proximity sensing range of 0.2 meters or more.

When a dielectric body 308, such as a human body part, comes within a coupling distance of the transmitting antenna 304, the dielectric body 308 changes the signal strength of the carrier wave received by the parasitic receiving antenna 312. The RF power detector 306 detects this increase in signal strength and provides a comparator 314 with data associated with the received carrier wave ("carrier wave data"). In various implementations, the comparator 314 is hardware, software, and/or firmware of an electronic device communicatively coupled to the wireless transmission system 300. For example, the RF power detector 306 may provide the comparator 314 with a waveform, or data represented by waveform, for comparison to the signal received by the parasitic receiving antenna 312.

In one implementation, the comparator 314 uses a signal strength change detected by the RF power detector 306 to determine a change in proximity between the dielectric body 308 and the wireless transmission system 300. The comparator 314 compares the signal strength changes of the received carrier wave with a number of stored threshold power change conditions associated with dielectric objects having different proximities to the wireless transmission system 300. For example, one threshold power change condition may be associated with a human body part within a first distance of the wireless transmission system 300. Another threshold power change condition may be associated with a human body part within a second distance of the wireless transmission system. Still other threshold power change conditions may be associated with non-human dielectric objects at one or more distances from the wireless transmission system 300. The various threshold power change conditions may be stored in volatile or non-volatile memory of an electronic device communicatively coupled to the wireless transmission system 300.

The comparator 314 returns a value to the RF power detector 305 that indicates which, if any, threshold power change condition is satisfied and/or a responsive action to be taken. Based on the value provided by the comparator 314, the RF power detector 306 modifies a transmission power level of the RF transmitter 302.

In another implementation, the comparator 314 determines one or more object characteristics (e.g., object type, object distance, object size, etc.) of the dielectric body 308 based on an analysis of waveform data stored in memory of a communicatively coupled electronic device. For example, the comparator 314 may compare a waveform of a signal received by the parasitic receiving antenna 312 with a plurality of stored carrier wave signatures, including pre-generated RF curves and/or pre-generated Fast Fourier Transform (FFT) curves. This analysis may be performed each time the RF power detector 306 detects a change in signal strength, or conditionally, if it is determined that the received signal strength satisfies a threshold power change condition.

The RF transmitter 302 may also transmit SAR-specific signatures and modulations that are sensitive to proximal objects to increase object-detection accuracy. Signatures may be embedded in actual transmission data (e.g., within gaps between data packets) as deemed appropriate by the transmission conditions.

Pre-generated RF or FFT curves associated with a variety of different dielectric objects with different object characteristics can be stored memory accessible by the comparator 314. For example, one pre-generated RF curve may be associated with a signal that is expected when the energy coupling between the transmitting antenna 304 and the parasitic receiving antenna 312 is influenced by a human body part. Another pre-generated RF curve may be associated with a signal that is expected when the energy coupling between the transmitting antenna 304 and the parasitic receiving antenna 312 is influenced by a table or other inanimate object.

If a system is capable of operating at two or more frequencies or frequency bands, the RF power detector 306 may select one frequency or band over another. For example, one frequency band may provide a greater risk to humans whereas another frequency band provides a lesser risk to humans. In this configuration, if the characteristics of humans and inanimate objects differ between different frequency bands, a scan of frequency bands or two or more frequency bands might be able to reduce the number of transmission adjustments for non-human events (e.g., one objective is to minimize or eliminate non-human transmission adjustments to optimize wireless user experience while maintaining legal compliance). Expanding this concept further, one can employ to RADAR techniques for methods of improving range resolution to targets (dielectric bodies) in the disclosed technology. In RADAR, a chirp pulse (where the frequency of a transmit pulse is altered in a linear or exponential manner) is often used to improve range resolution to the target. If the sensing transmitter were to utilize the RADAR technique (essentially making a very short range RADAR), in one or more frequency bands, the system may improve the detection (of humans) by enhancing range resolution to avoid triggering a transmitter power back off techniques or other transmission adjustment unnecessarily early.

In yet another implementation, the comparator 314 uses an auto-correlation function to measure similarity between a received waveform and one or more pre-generated waveforms. For example, an auto-correlation function may be used to compute a value for the transmitted carrier wave. The function may also be used to compute a pre-generated RF or FFT curve. If these computed values lie within a pre-defined error margin of one another, one or more object characteristics of the dielectric body 308 can be identified. In this manner, auto-correlation functions can be utilized to discern randomness (e.g., false positives) from actual objects and/or to determine one or more of an object type (e.g., a human), object distance, object size, etc. Correlation values for various pre-generated RF and FFT curves may be stored in tuning tables or other device memory accessible by the comparator 314.

In one implementation, the comparator 314 derives a correlation value $r_k$ using the auto-correlation function given by Equation 1, below:

$$r_k = \frac{\sum_{i=1}^{N-k}(Y_i - Y)(Y_{i+k} - Y)}{\sum_{i=1}^{N}(Y_i - Y)^2} \quad (1)$$

where Y is the mean function; k is an auto correlation lag; and N is a total number of data points used in the comparison. In another implementation, the auto correlation lag (k) is equal to 1. In Equation (1), the correlation value $r_k$ can be used to discern an object type when rough object detection occurs. For example, rough object detection may occur when the RF power detector 306 detects a discernable increase in signal strength of the carrier wave. When "rough" object detection occurs, the auto-correlation function (e.g., Equation 1) can be used to identify a pre-generated RF curve that is most closely correlated with the received carrier wave. From this correlation, the comparator 314 can determine one or more object characteristics of the dielectric body and/or determine an appropriate response action.

In the above-described implementation, the comparator 314 returns a value to the RF power detector 306 that indicates which object characteristic is satisfied and/or a responsive action to be taken. Based on the value provided by the comparator 314, the RF power detector 306 modifies a transmission power level of the RF transmitter 302.

Alternatively, the comparator 314 can use an auto-correlation function to measure for similarity or correlation between a transmitted carrier waveform (e.g., received from the RF transmitter 302) and a received waveform (e.g., detected by the parasitic receiving antenna 312). For example, such measure may be used to determine whether a signal strength change results from the carrier wave signal itself or from a combination of other external signals detected by the parasitic receiving antenna 312.

In the event that the auto-correlation function results are inconclusive, then the wireless transmission system 300 may prompt the user to provide input as to which type of object is proximate to the RF receiving antenna 312. The user input may be stored in memory so that a more conclusive auto-correlation result may be determined when a similar object is proximate to the RF receiving antenna 312. An inconclusive auto-correlation result may be based on a high error output from the correlation function. The most closely correlating pre-generated curve may be accepted even where correlation error is high to avoid the need for user input. In the case of a correlation tie between two pre-generated curves, a tie-breaker may be selected based on the achievement of a higher power reduction to err on the side of safety.

Figure 4:
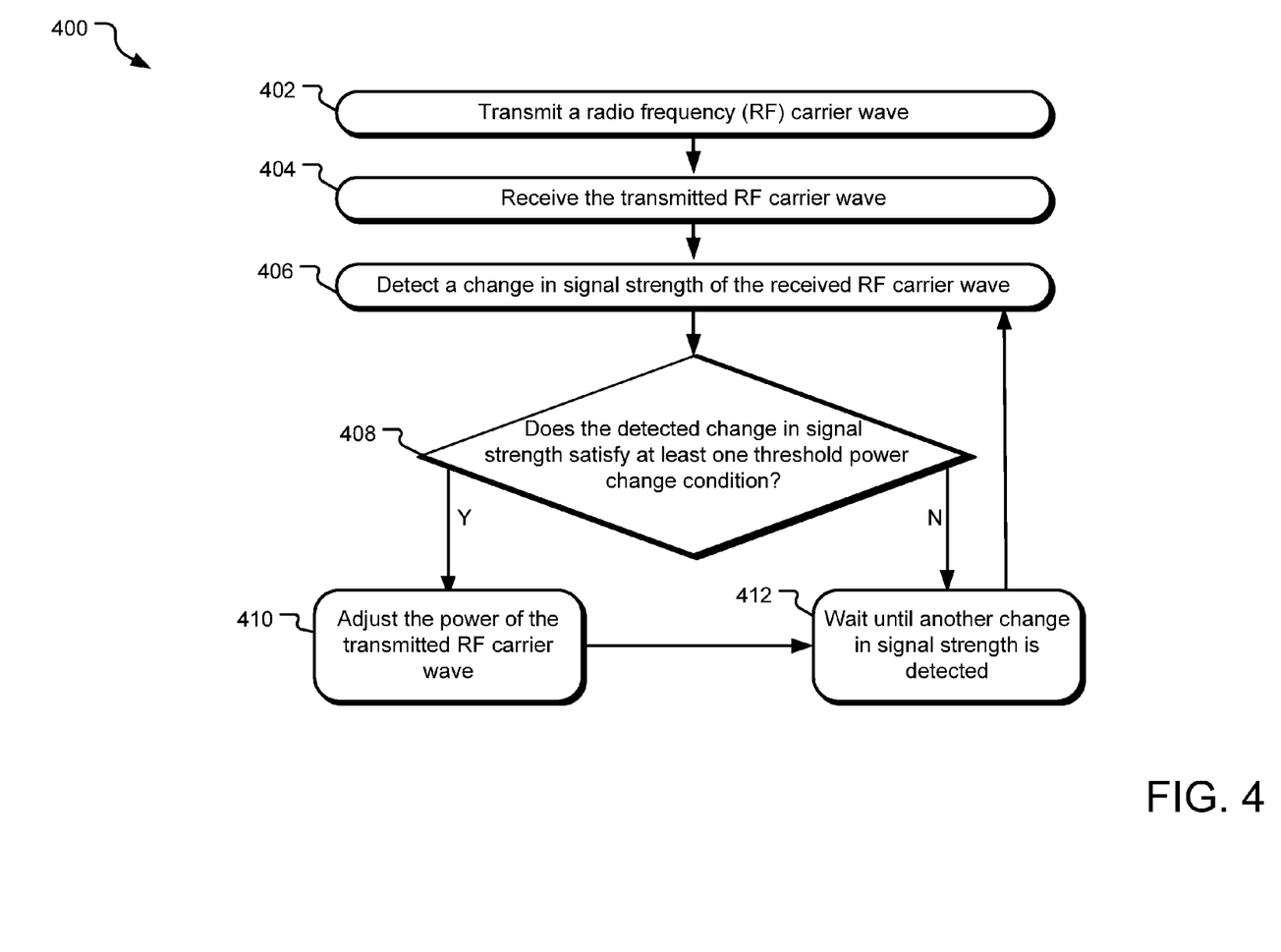
FIG. 4 illustrates example operations for a wireless transmission system with dynamic transmission power adjustment.

FIG. 4 illustrates example operations 400 for a wireless transmission system with dynamic transmission power adjustment. A transmission operation 402 transmits an RF carrier wave, such as a mobile telephone RF signal. A receiving operation 404 receives the RF carrier wave. In one implementation, the receiving operation 404 is performed by an RF receiving antenna positioned proximal to an RF transmitting antenna that performs the transmission operation 402. A detection operation 406 detects a change in the signal strength of the received RF carrier wave. In one implementation, the detection operation 406 is performed by an RF power detector coupled to a parasitic receiving antenna. Other implementations may also be employed.

A determination operation 408 determines whether the detected change in signal strength of the received RF carrier wave satisfies at least one threshold power change condition. Threshold power change conditions may be stored in memory locations accessible by an RF power detector of the wireless transmission system.

If the detected change in signal strength satisfies a threshold power change condition, additional analysis may be performed to determine an appropriate responsive action. For example, waveform data of the received RF carrier wave may be compared with a plurality of stored carrier wave signatures, including pre-generated RF curves and/or pre-generated Fast Fourier Transform (FFT) curves. Each of the stored carrier wave signatures may be associated with the carrier wave when influenced by a dielectric object having one or more different object characteristics. By measuring a correlation between the received carrier wave and the stored wave signatures, one or more object characteristics of the dielectric object can be determined. Based on this analysis, a responsive action can be identified and implemented.

If the determination operation 408 determines that the detected change in signal strength satisfies at least one threshold power change condition, an adjustment operation 410 adjusts the power of the transmitted RF carrier wave. The degree of the power adjustment may depend on the magnitude of the detected change in signal strength and/or one or more object characteristics associated with stored RF and FFT curves.

For example, an increase in signal strength detected by the detection operation 406 may indicate that a dielectric object (e.g., a human) has approached the wireless transmission system to within a detectable proximity. In one implementation, the proximity of the dielectric object is determined based on the magnitude of the change in signal strength. If this proximity is a distance where a radiation risk exists (e.g., as defined by applicable SARs regulations), the detected change in signal strength satisfies a threshold power change condition and the adjustment operation 410 decreases the power of the transmitted RF carrier wave to reduce the radiation risk. In this situation, the magnitude of the power decrease is based on the particular threshold power change condition satisfied.

Alternatively, a change in the signal strength detected by the detection operation 406 may indicate that a dielectric object has moved away from the wireless transmission system. If the dielectric object has moved to a distance where the radiation risk is mitigated or eliminated as compared to a prior position, the decrease in signal strength may satisfy a threshold power change condition. In this situation, the adjustment operation 410 increases the power of the transmitted RF carrier wave by a magnitude that depends on the particular threshold power change condition satisfied.

After the adjustment operation 410 adjusts the power of the transmitted RF carrier wave, a waiting operation 412 is assumed until another change in signal strength is detected by the detection operation 406.

If the determination operation 408 determines that the detected increase in signal strength does not satisfy a threshold power change condition, the adjustment operation 410 is not taken. Rather, the waiting operation 412 is assumed until another change in signal strength is detected by the detection operation 406.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method comprising:
   detecting a change in signal strength of a carrier wave at an RF receiver of an electronic device, the RF receiver separated from an RF transmitter of the electronic device that communicates the carrier wave to the RF receiver, the change in the signal strength being influenced by proximity of a dielectric body positioned external to the electronic device relative to the RF transmitter; and
   adjusting transmission power of the carrier wave transmitted from the RF transmitter based on the detected change in signal strength.

2. The method of claim 1 wherein the RF receiver includes a parasitic receiving antenna coupled to the electronic device.

3. The method of claim 1 further comprising:
   determining the proximity of the dielectric body based on the detected change in the signal strength of the carrier wave received by the RF receiver from the RF transmitter.

4. The method of claim 1 wherein adjusting operation comprises:
   adjusting the transmission power of the carrier wave transmitted from the RF transmitter if the detected change in the signal strength satisfies a threshold power change condition.

5. The method of claim 1 wherein the adjusting operation decreases the transmission power of the RF transmitter, responsive to detection of the change in the signal strength of the carrier wave received by the RF receiver.

6. The method of claim 1 wherein the adjusting operation increases the transmission power of the RF transmitter, responsive to detection of the change in the signal strength of the carrier wave received by the RF received.

7. The method of claim 1 wherein the carrier wave includes a mobile telephone RF transmission.

8. The method of claim 1 wherein the detecting operation further comprises:
   measuring a correlation between the carrier wave and a stored wave signature to determine an object characteristic of the dielectric body.

9. The method of claim 8 wherein the object characteristic is an object type.

10. The method of claim 8 wherein the object characteristic is the proximity between the dielectric body and the RF transmitter.

11. A electronic device comprising:
    a radiofrequency (RF) transmitter in the electronic device and being configured to transmit a carrier wave from the electronic device;
    an RF receiver in the electronic device, the RF receiver separate from the RF transmitter and being configured to receive the carrier wave transmitted from the RF transmitter; and
    a power detector coupled to the RF transmitter and the RF receiver, the power detector being configured to adjust transmission power of the RF transmitter responsive to detection of a change in signal strength of the carrier wave received by the RF receiver, the change in signal strength being influenced by proximity of a dielectric body to the RF transmitter.

12. The electronic device of claim 11 wherein the power detector adjusts transmission power of the carrier wave transmitted from the RF transmitter, if the detected change in signal strength satisfies a threshold power change condition.

13. The electronic device of claim 11 wherein the carrier wave includes a mobile telephone RF transmission.

14. The electronic device of claim 11 wherein the RF receiver includes a parasitic receiving antenna, and the parasitic receiving antenna and the RF transmitter are coupled within the electronic device.

15. The electronic device of claim 11 further comprising:
    a comparator coupled to the power detector that identifies a proximity of the dielectric body based on the change in the signal strength of the carrier wave received by the RF receiver.

16. The electronic device of claim 11 further comprising:
    a comparator coupled to the power detector that measures a correlation between the carrier wave transmitted by the RF transmitter and the carrier wave received by the RF receiver.

17. The electronic device of claim 16 wherein the comparator measures the correlation using at least one auto-correlation function.

18. The electronic device of claim 11 further comprising:
a comparator coupled to the power detector that measures a correlation between the carrier wave received by the RF receiver and a stored wave signature to determine an object characteristic of the dielectric body.

19. A processing circuit configured to perform steps comprising:
analyzing proximity sensing data received at an RF receiver of an electronic device by comparing the proximity sensing data with a pre-generated curve representing an object type in proximity to a radiofrequency (RF) transmitter in an electronic device, the proximity sensing data being based on a waveform of a carrier signal transmitted by the RF transmitter and received by the RF receiver, the RF transmitter separated from the RF receiver within the electronic device; and
adjusting transmission characteristics of a transmission signal transmitted by the RF transmitter based on the analyzed proximity sensing data.

20. The processing circuit of claim 19 wherein the object type is associated with a human being.

* * * * *